(12) United States Patent
Teshima

(10) Patent No.: US 8,894,785 B2
(45) Date of Patent: Nov. 25, 2014

(54) MANUFACTURING METHOD OF PNEUMATIC TIRE AND MANUFACTURING APPARATUS OF PNEUMATIC TIRE

(71) Applicant: Toyo Tire & Rubber Co., Ltd., Osaka-shi, Osaka (JP)

(72) Inventor: Toshiharu Teshima, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 0 days.

(21) Appl. No.: 13/682,458

(22) Filed: Nov. 20, 2012

(65) Prior Publication Data

US 2013/0133810 A1 May 30, 2013

(30) Foreign Application Priority Data

Nov. 24, 2011 (JP) ................................. 2011-256354

(51) Int. Cl.
*B29D 30/72* (2006.01)
*B29D 30/10* (2006.01)

(52) U.S. Cl.
CPC ................ *B29D 30/10* (2013.01); *B29D 30/72* (2013.01)
USPC ......................... 156/126; 156/110.1; 156/123

(58) Field of Classification Search
CPC .... B29D 30/0016; B29D 30/14; B29D 30/18; B29D 30/244; B29D 30/2607; B29D 30/28; B29D 30/32; B29D 30/72; B29D 30/16; B29D 30/26; B29D 30/30
USPC ........ 156/126, 130.7, 402, 403, 406.2, 110.1, 156/123, 131, 421.6
See application file for complete search history.

(56) References Cited

U.S. PATENT DOCUMENTS

| | | | | |
|---|---|---|---|---|
| 5,074,949 A | * | 12/1991 | Kusakabe et al. | 156/402 |
| 2010/0276068 A1 | * | 11/2010 | Marchini et al. | 156/133 |
| 2010/0288423 A1 | * | 11/2010 | Marchini et al. | 156/123 |

FOREIGN PATENT DOCUMENTS

| | | | | | |
|---|---|---|---|---|---|
| JP | 249-103967 | * | 10/1974 | ............. | B29C 67/00 |
| JP | 6-270287 A | | 9/1994 | | |
| JP | 2001-260250 | * | 9/2001 | ............. | B29D 30/38 |
| JP | 2002-307571 A | | 10/2002 | | |
| JP | 2006-159450 | * | 6/2006 | ............. | B29D 30/18 |
| JP | 2009-28966 | * | 2/2009 | ............. | B29D 30/16 |
| JP | 2009-83458 | * | 4/2009 | ............. | B29D 30/16 |
| JP | 2009-178874 | * | 8/2009 | ............. | B29D 30/18 |
| WO | WO 2012/042539 | * | 4/2012 | ............. | B29D 30/32 |

OTHER PUBLICATIONS

Machine generated English language translation of JP 2009-83458 (original document dated Apr. 2009).*

(Continued)

*Primary Examiner* — Martin Rogers
(74) *Attorney, Agent, or Firm* — Westerman, Hattori, Daniels & Adrian, LLP

(57) ABSTRACT

An annular rubber member is molded, across a through hole, on a support surface of a support device that includes the support surface and the through hole which opens to the support surface. The rubber member molded on the support surface is arranged so as to oppose a sidewall unit of a shaped tire intermediate body. The support device is moved close to the tire intermediate body and the rubber member on the support surface is brought into contact with the sidewall unit. The rubber member is adhered to the sidewall by moving the press member that presses the rubber member to the side wall unit via the through hole, in a tire radial direction.

4 Claims, 8 Drawing Sheets

(56) References Cited

OTHER PUBLICATIONS

Machine generated English language translation of JP 2006-159450 (original document dated Jun. 2006).*
Machine generated English language translation of JP 2009-178874 (original document dated Aug. 2009).*
Machine generated English language translation of JP 2001-260250 (original document dated Sep. 2001).*
Machine generated English language translation JP 2009-28966 (original document dated Feb. 2009).*

* cited by examiner

MANUFACTURING METHOD OF PNEUMATIC TIRE AND MANUFACTURING APPARATUS OF PNEUMATIC TIRE

BACKGROUND OF THE INVENTION

1. Field of the Invention

The present invention relates to a manufacturing method of a pneumatic tire and a manufacturing apparatus of the pneumatic tire.

2. Background Art

In general, a pneumatic tire is manufactured such that individual tire configuring members such as an inner liner unit, a sidewall unit, a bead unit and a tread unit are formed in advance, these tire configuring members are bonded in an unvulcanized state to mold a green tire, and the green tire goes through vulcanized molding.

In this manufacturing method of such a pneumatic tire, there is a method which molds a green tire by adhering an annularly molded rubber member to a sidewall unit of an unvulcanized tire intermediate body which is shaped to be toroidal.

JP-A-6-270287 or JP-A-2002-307571 discloses that after an annular rubber member adhered onto a support surface of a support device is transferred to a sidewall unit of an unvulcanized tire intermediate body which is subjected to shaping, a rubber member is adhered to a sidewall unit by inflating bladders provided at both sides of a bead lock drum which holds the tire intermediate body. In this case, it is concerned that the rubber member cannot be uniformly adhered due to wrinkling of the rubber member when the rubber member is transferred to the sidewall unit from the support device which supports the rubber member.

SUMMARY OF THE INVENTION

The present invention is made in view of the above-mentioned problem, and an object thereof is to provide a manufacturing method of a pneumatic tire and a manufacturing apparatus of the pneumatic tire, which are capable of uniformly adhering an annular rubber member to a sidewall unit of an unvulcanized tire intermediate body which is subjected to shaping, without wrinkling on the sidewall unit.

In a manufacturing method of a pneumatic tire according to an embodiment, an annular rubber member is molded, across a through hole, on a support surface of a support device that includes the support surface and the through hole which opens to the support surface. The rubber member molded on the support surface is arranged so as to oppose a sidewall unit of a shaped tire intermediate body. The support device is moved close to the tire intermediate body and the rubber member on the support surface is brought into contact with the sidewall unit. The rubber member is pressed to the sidewall unit by the press member via the through hole, and the rubber member is adhered to the sidewall unit by moving the press member in a tire radial direction.

In addition, a manufacturing apparatus of a pneumatic tire according to an embodiment includes a support device that includes a support surface and a through hole which opens to the support surface, and where an annular rubber member is molded, across the through hole, on the support surface; a tire holder that holds a shaped tire intermediate body; a support device holder that holds the support device and positions the rubber member so as to oppose a sidewall unit of the tire intermediate body held by the tire holder; a driver that causes the support device holder and the tire holder to come relatively close to each other, and that brings the rubber member molded on the support surface of the support device into contact with the sidewall unit; and a press member that moves in a tire radial direction while pressing the rubber member to the sidewall unit via the through hole.

According to the present invention, it is possible to uniformly adhere an annular rubber member to a sidewall unit of an unvulcanized tire intermediate body which is subjected to shaping, without wrinkling on the sidewall unit.

DETAILED DESCRIPTION OF THE INVENTION

Figure 1:
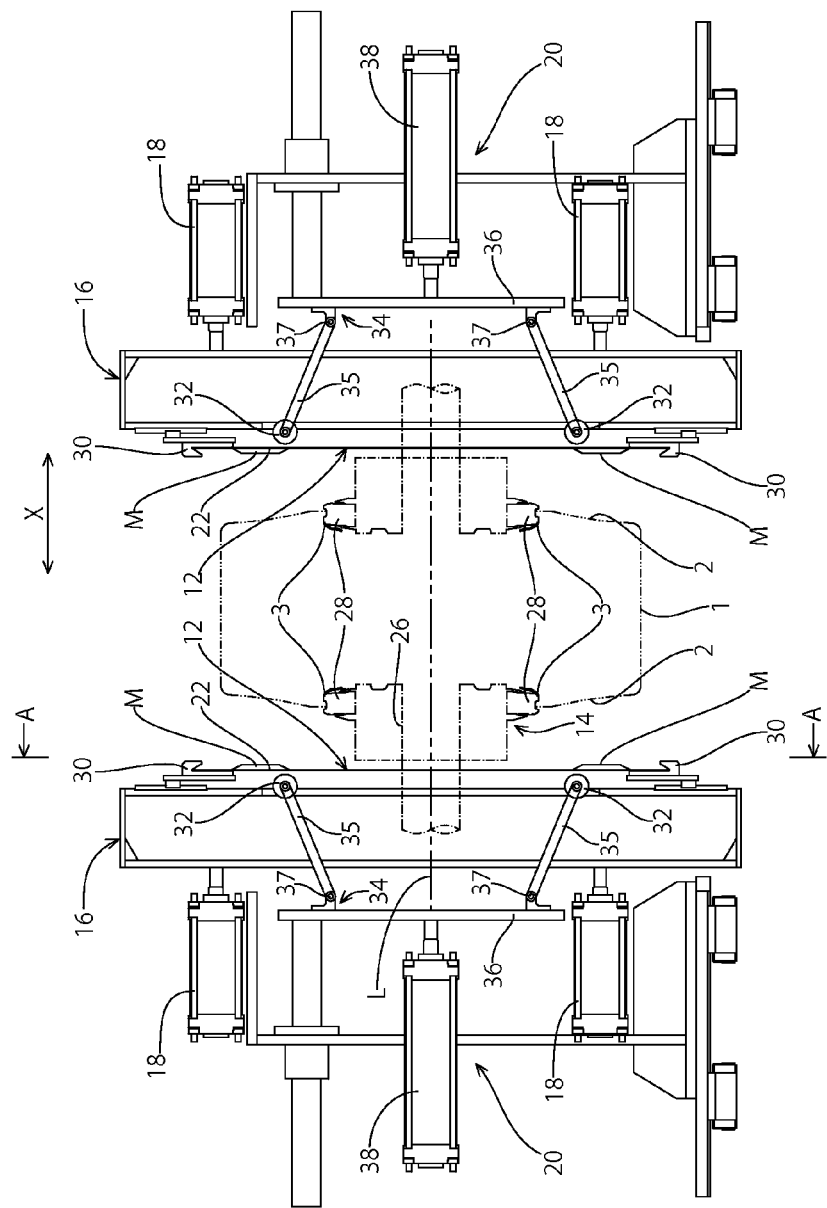
FIG. 1 is a schematic configuration diagram illustrating a manufacturing apparatus of a pneumatic tire according to an embodiment of the present invention.

As illustrated in FIG. 1, a manufacturing apparatus (hereinafter referred to as a manufacturing apparatus) 10 of a pneumatic tire according to the present embodiment includes a support device 12 where a rubber member M is molded on a support surface 22, a tire holder 14 that holds a shaped tire intermediate body 1, a support device holder 16 that holds the support device 12, a driver 18 that causes the support device holder 16 and the tire holder 14 to relatively move close to and apart from each other, and a press mechanism 20 that presses the rubber member M to a sidewall unit 2 of the tire intermediate body 1. The manufacturing apparatus 10 adheres the rubber member M to a sidewall unit 2 of an unvulcanized tire intermediate body 1 which is shaped to be toroidal.

Figure 2:
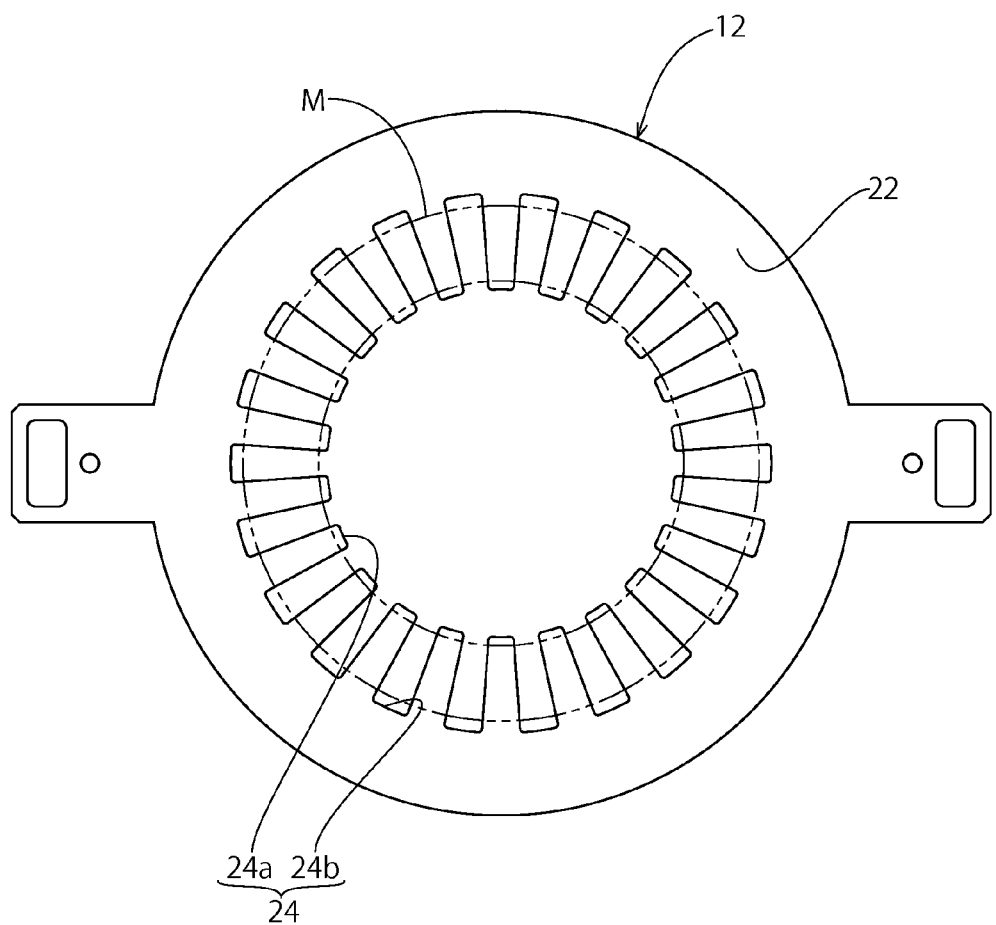
FIG. 2 is a plan view of a support device.

As illustrated in FIG. 2, the support device 12 is a metal plate-like member which is elastically deformable, and a support surface 22 for molding the rubber member M is formed at one side plate surface. The support device 12 includes a through hole 24 which opens to the support surface 22. The through hole 24 is formed from a circle hole 24a which is circular in planar view, and a plurality of long holes 24b radially extending from the circle hole 24a at equal intervals in the circumferential direction.

The support device 12 having such a configuration causes a mouthpiece of an extruder (not illustrated) to come close to the support surface 22, and while relatively rotating the support device 12 and the extruder, discharges a rubber material from the mouthpiece onto the support surface 22. In this manner, the rubber member M which has an annular thin plate shape is molded, across long holes 24b, on the support surface 22.

As illustrated in FIG. 1, the tire holder 14 includes a main shaft 26 extending along a rotation shaft L of the holding tire intermediate body 1, and a pair of bead support portions 28 attached to the main shaft 26.

A pair of the bead support portions 28 is movable in an axial direction (that is, the direction along the rotation shaft L) X of the main shaft 26, being provided so as to be deformable for expansion and contraction, and supports bead portions 3 of the unvulcanized tire intermediate body 1 which is shaped to be toroidal, from the inner side in the radial direction.

The support device holder 16 includes pawls 30 which engage with the side end of the support device 12. The support device holder 16 holds the support device 12 by the pawls 30 engaging with the side end of the support device 12 such that the rubber member M provided on the support surface 22 of the support device 12 opposes the sidewall unit 2 of the tire intermediate body 1 held by the tire holder 14, and the center of the annular rubber member M matches with the rotation shaft L of the tire intermediate body 1. In addition, the long holes 24b of the support device 12 held by the support device holder 16 radially extend around the rotation shaft L of the tire intermediate body 1.

As illustrated in FIG. 1, in the present embodiment, two support device holders 16 are provided by pinching the tire intermediate body 1 held by the tire holder 14 in the axial direction X. The rubber member M provided at the support device 12 held by one support device holder 16 opposes one sidewall unit 2 of the tire intermediate body 1. The rubber member M provided at the support device 12 held by the other support device holder 16 opposes the other sidewall unit 2 of the tire intermediate body 1.

The driver 18 includes a cylinder that moves the support device holder 16 back and forth in the axial direction X of the main shaft 26 and causes the support device holder 16 to move close to and apart from the sidewall unit 2 of the tire intermediate body 1 held by the tire holder 14.

In the present embodiment, described is a case where the driver 18 moves the support device holder 16 with respect to the tire holder 14, but the tire holder 14 may be moved with respect to the support device holder 16.

As illustrated in FIG. 1, the press mechanism 20 includes a plurality of press members 32 which press the rubber member M to the sidewall unit 2 of the tire intermediate body 1, a plurality of connection members 34 which connect a plurality of the press members 32, and a cylinder device 38 which moves the connection members 34 along the axial direction X of the main shaft 26. The press mechanism 20 is arranged opposing the opposite side surface of the support surface 22 in the support device 12, so as to pinch the support device 12 held by the support device holder 16 between the tire intermediate body 1 and the press mechanism 20.

Figure 3:
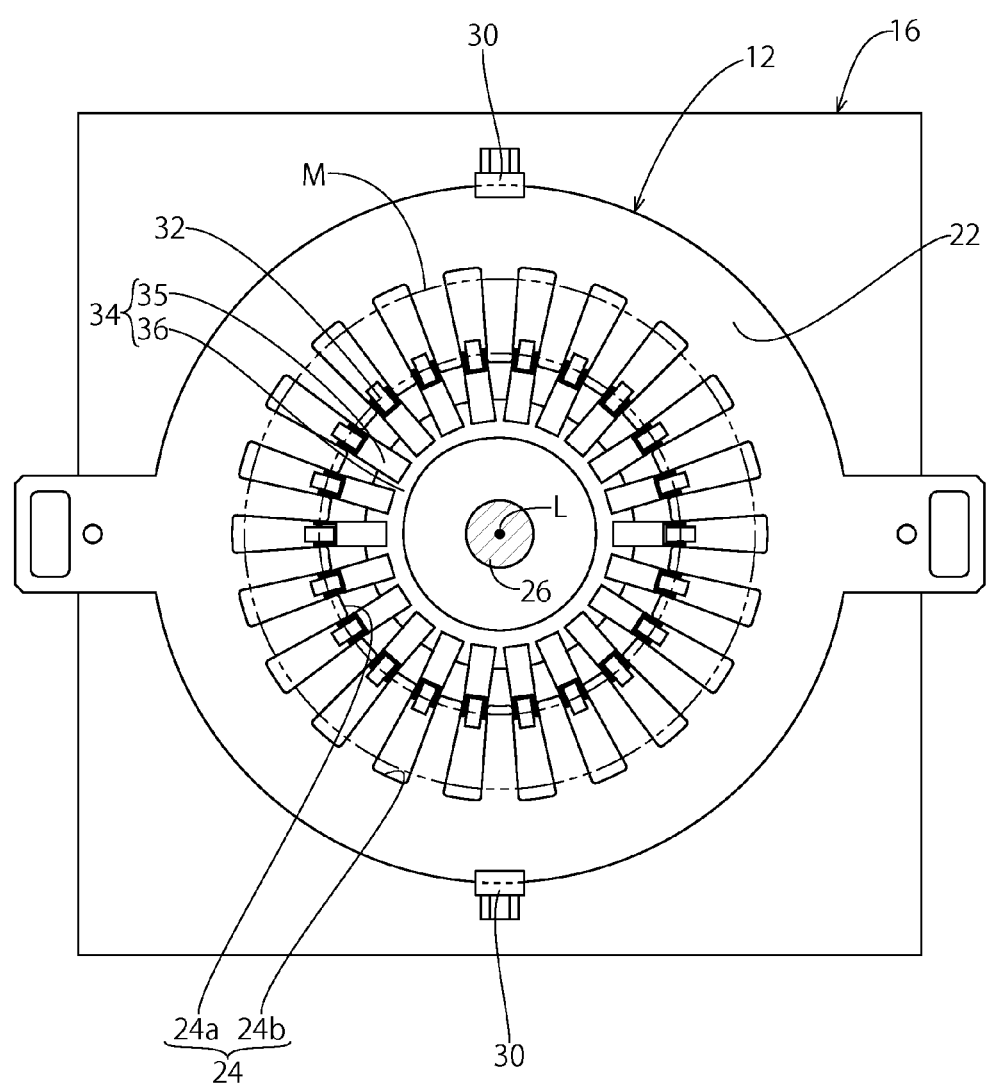
FIG. 3 is a cross-sectional view along line A-A in FIG. 1.

A plurality of the press members 32 are each a member formed from a roller or the like which can move the rubber member M in the radial direction of the tire intermediate body 1 while pressing the rubber member M to the sidewall unit 2 of the tire intermediate body 1. As illustrated in FIG. 3, these press members 32 are radially arranged around the rotation shaft L of the tire intermediate body 1, at equal intervals in the circumferential direction of the tire intermediate body 1, so as to oppose the long holes 24b drilled on the support device 12.

The connection members 34 include a plurality of support arms 35 provided for each of the press members 32, and connection plates 36 which connect a plurality of the support arms 35. The press members 32 are attached to one end of the support arms 35 and the connection plates 36 are attached to the other end via a spindle 37.

As illustrated in FIG. 1, in a state where the rubber member M is not in contact with the press members 32, and force around the spindle 37 does not act, the support arms 35 expand outward in the radial direction so as to be apart from the rotation shaft L of the tire intermediate body 1 as it goes toward one end side (side to which the press members 32 are attached). The support arms 35 arrange the press members 32 at a position opposing the inner peripheral edge of the rubber member M provided at the support device 12.

In addition, if the press members 32 come into contact with the rubber member M, the support arms 35 are rotated around the spindle 37, and the press members 32 illustrated in FIG. 1 are moved from the position opposing the inner peripheral edge of the rubber member M outward in the radial direction.

An output shaft of the cylinder device 38 which can advance and retreat along the axial direction X of the main shaft 26 is connected to the connection plates 36. The connection plates 36 move close to and apart from the support device 12 held by the support device holder 16 by the operation of the cylinder device 38.

Next, using the above-described manufacturing apparatus 10, a method which adheres the rubber member M to the sidewall unit 2 of the unvulcanized tire intermediate body 1 which is shaped to be toroidal will be described.

First, as illustrated in FIG. 1, the tire intermediate body 1 is held by the tire holder 14. In addition, the support device 12 where the rubber member M is molded on the support surface 22 is held by the support device holder 16.

At this time, the support device 12 held by the support device holder 16 is arranged at a distance apart from the sidewall unit 2 of the tire intermediate body 1 in the axial direction X of the main shaft 26. In addition, the press members 32 which belong to the press mechanism 20 are arranged at a position further apart from the tire intermediate body 1 in the axial direction X of the main shaft 26 than the support device 12, and oppose the inner peripheral edge of the rubber member M molded on the support surface 22 through the long holes 24b of the support device 12.

Figure 4:
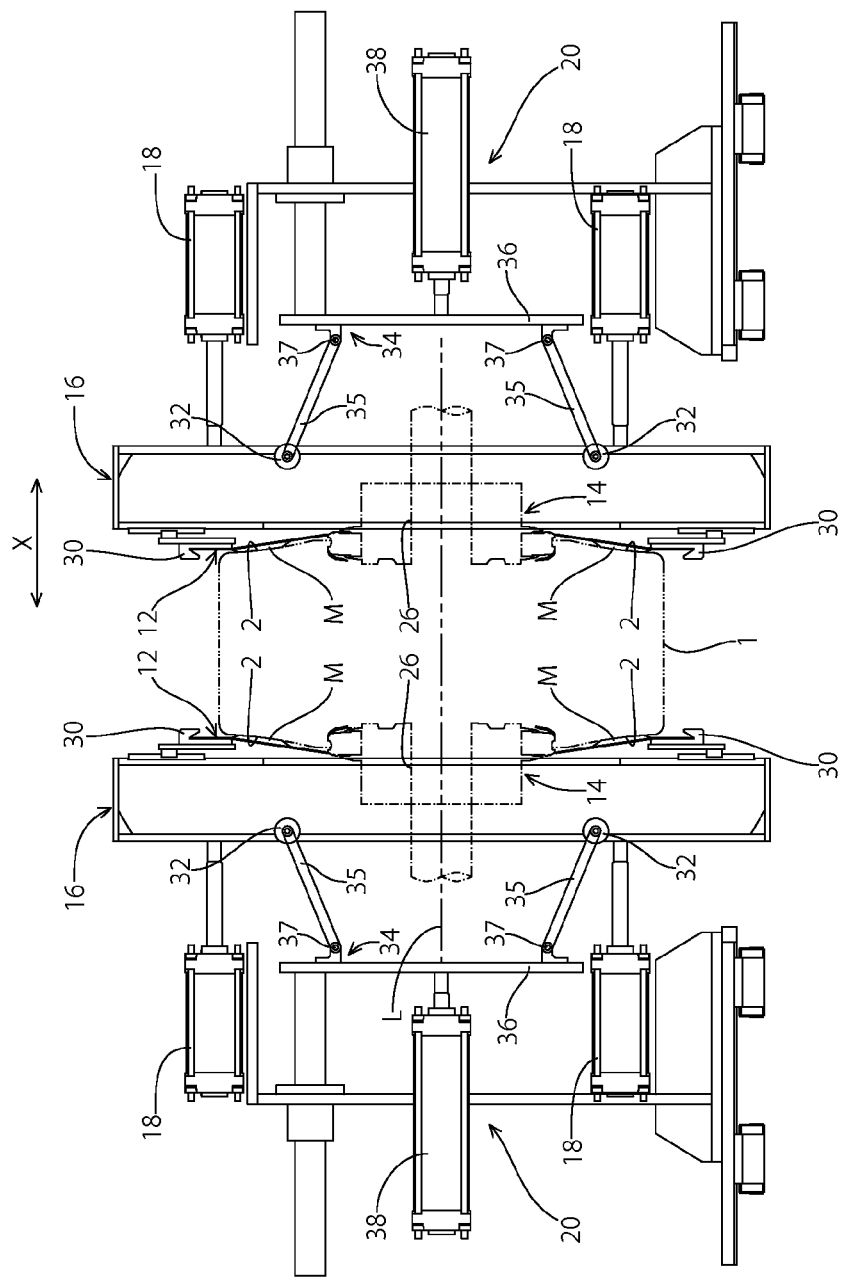
FIG. 4 is an explanatory view illustrating an operation of the manufacturing apparatus of a pneumatic tire illustrated in FIG. 1.

Next, by operating a cylinder which belongs to the driver 18 and moving the support device holder 16 in a close direction with respect to the sidewall unit 2 of the tire intermediate body 1, as illustrated in FIG. 4, at least a portion of the rubber member M molded on the support surface 22 of the support device 12 is brought into contact with the sidewall unit 2 of the tire intermediate body 1.

In the present embodiment, the support device 12 which supports the rubber member M is elastically deformable. Accordingly, even when the sidewall unit 2 of the tire intermediate body 1 has a curved shape, the support device 12 deforms along the shape of the sidewall unit 2 and thereby can bring the rubber member M into contact with the sidewall unit 2.

Figure 5:
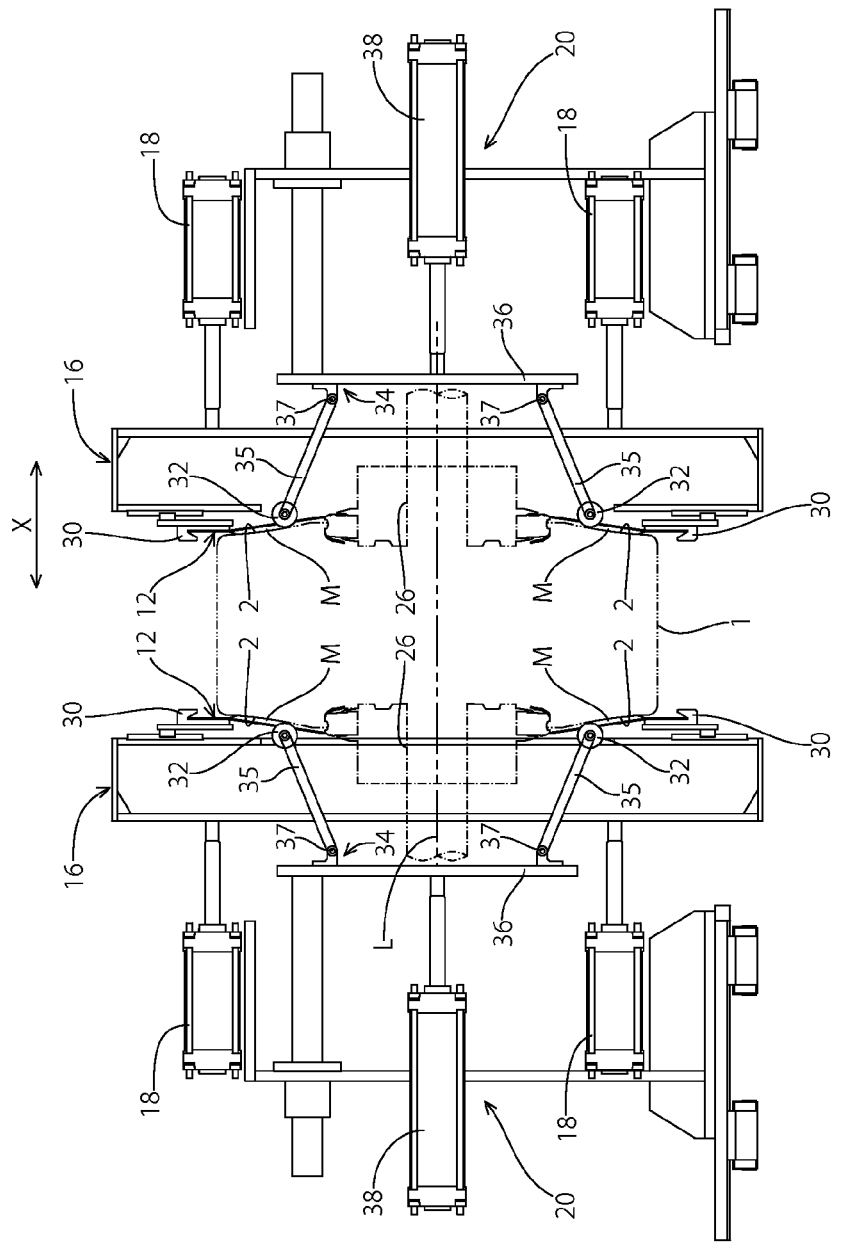
FIG. 5 is an explanatory view illustrating an operation of the manufacturing apparatus of a pneumatic tire illustrated in FIG. 1.

Next, while maintaining a state where the rubber member M on the support surface 22 of the support device 12 is brought into contact with the sidewall unit 2 of the tire intermediate body 1, by operating the cylinder device 38 which belongs to the press mechanism 20, the connection plates 36 are moved close to the support device 12 held by the support device holder 16. Then, as illustrated in FIG. 5, the press members 32 provided at one end of the support arms 35 are brought into contact with the inner peripheral edge of the rubber member M through the long holes 24b drilled on the support device 12.

Then, from a state where the press members 32 are brought into contact with the inner peripheral edge of the rubber member M, by operating the cylinder device 38 again, the connection plates 36 are moved close to the support device 12 held by the support device holder 16. Accordingly, the press members 32 press the rubber member M to the sidewall unit 2 of the tire intermediate body 1. At that time, reaction from the rubber member M causes force around the spindle 37 with respect to the support arms 35 to act on the support arms 35, and the force moves the press members 32 from the position opposing the inner peripheral edge of the rubber member M outward in the radial direction. Accordingly, the press members 32, while crimping the rubber member M to the sidewall unit 2 of the tire intermediate body 1, move from the inner peripheral edge to the outer peripheral edge of the rubber member M, outward in the radial direction of the tire intermediate body 1 (refer to FIG. 6).

Figure 6:
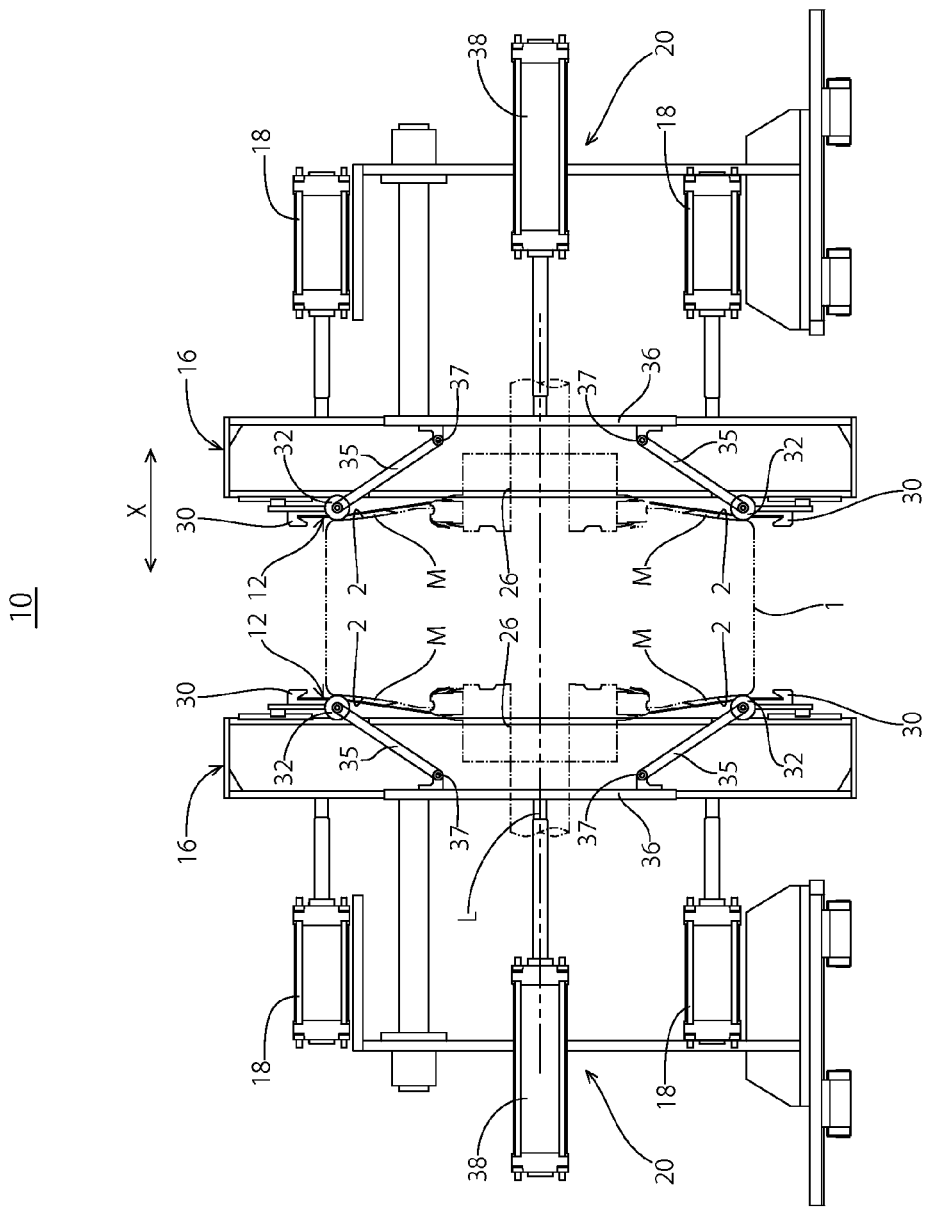
FIG. 6 is an explanatory view illustrating an operation of the manufacturing apparatus of a pneumatic tire illustrated in FIG. 1.
Figure 7:
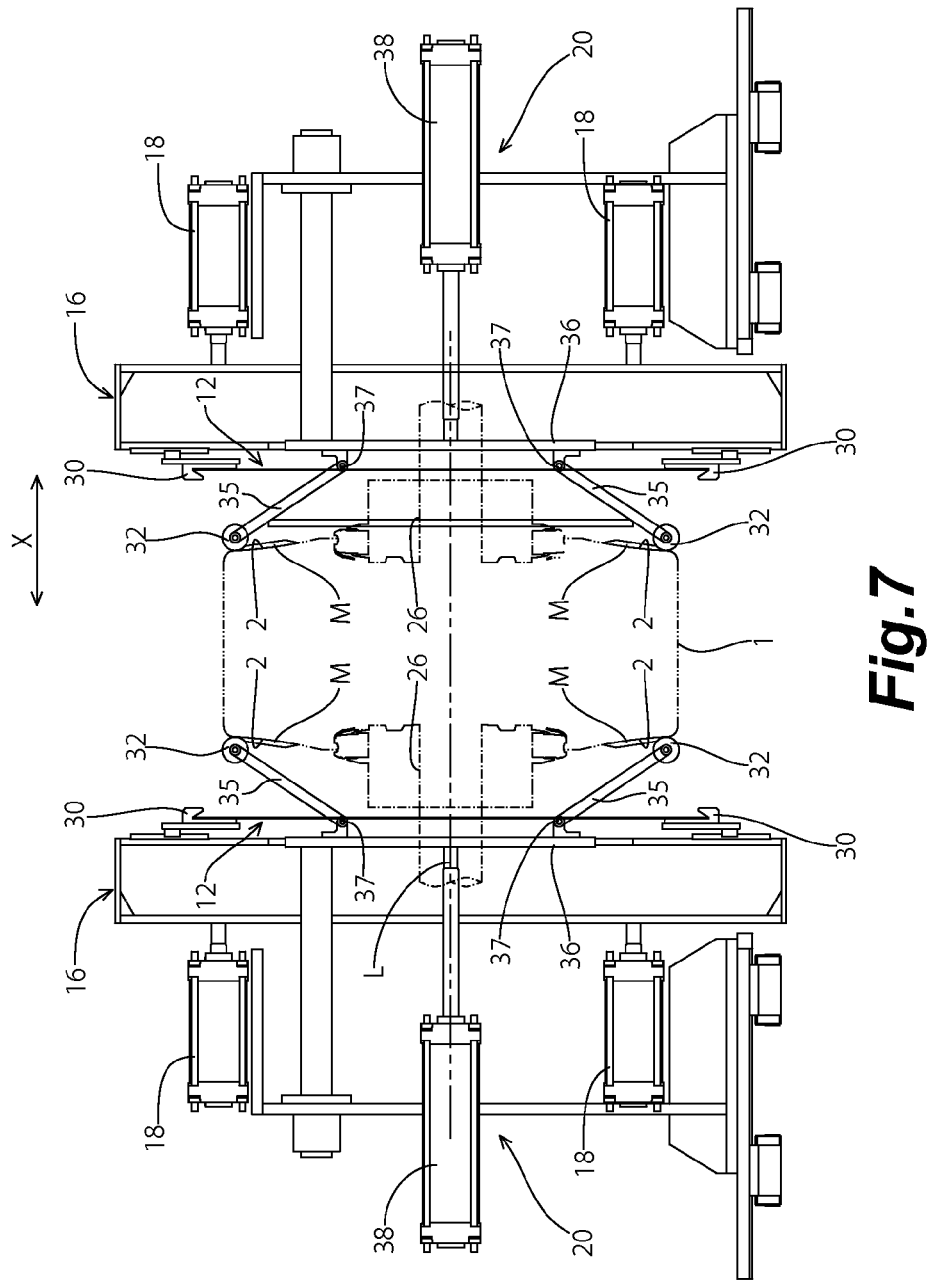
FIG. 7 is an explanatory view illustrating an operation of the manufacturing apparatus of a pneumatic tire illustrated in FIG. 1.
Figure 8:
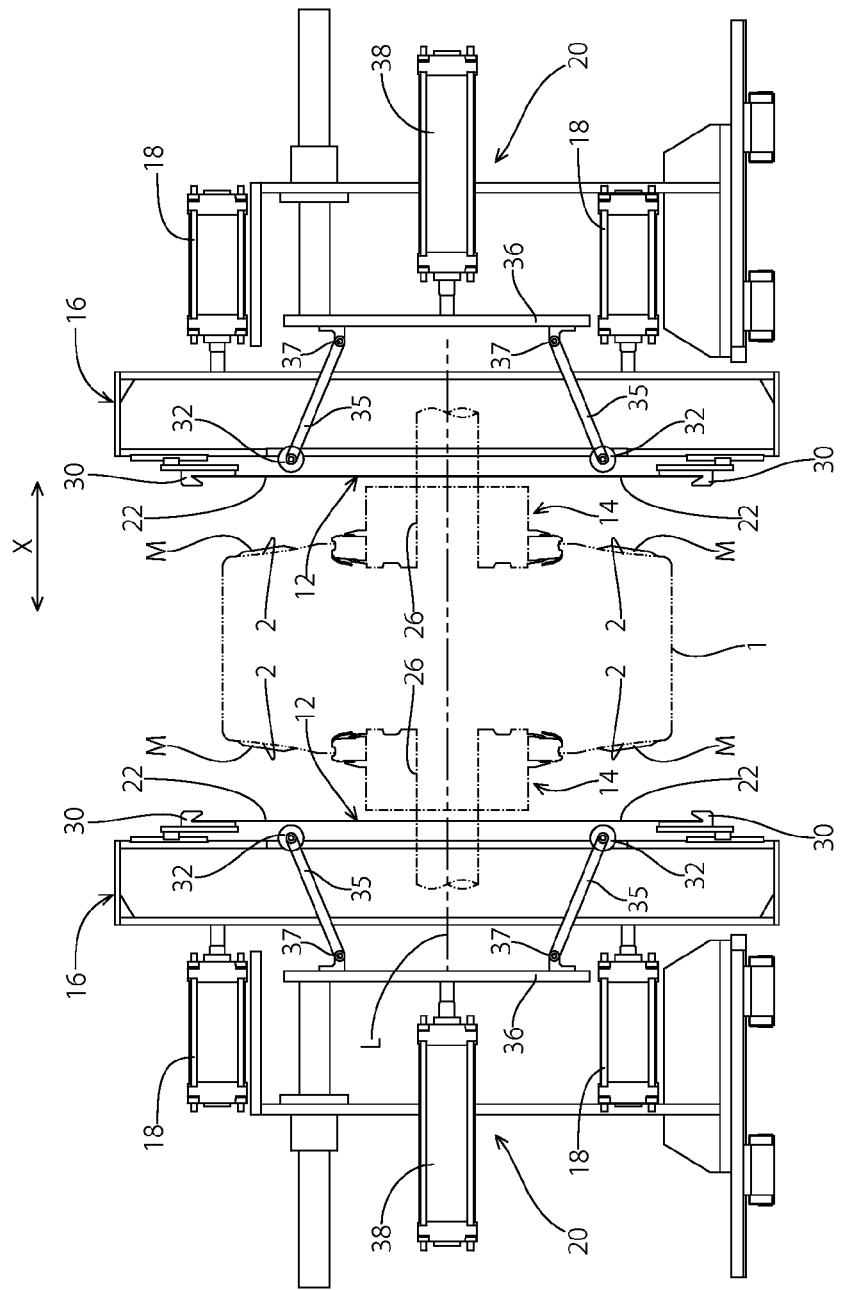
FIG. 8 is an explanatory view illustrating an operation of the manufacturing apparatus of a pneumatic tire illustrated in FIG. 1.

Next, while maintaining a state where the press members 32 illustrated in FIG. 6 press the outer peripheral edge of the rubber member M to the sidewall unit 2 of the tire intermediate body 1, by operating the cylinder which belongs to the driver 18, the support device holder 16 is moved apart from the sidewall unit 2 of the tire intermediate body 1, and as illustrated in FIG. 7, the rubber member M is peeled off from the support surface 22 of the support device 12.

Next, by operating the cylinder device 38 which belongs to the press mechanism 20 and moving the connection plates 36 in the direction apart from the support device 12, the press members 32 are moved to the opposite side of the support surface 22 in the support device 12 illustrated in FIG. 1 through the long holes 24b of the support device 12.

As described above, in the present embodiment, in a state where the rubber member M on the support surface 22 is brought into contact with the sidewall unit 2 if the tire intermediate body 1, the press members 32 move in the radial direction of the tire intermediate body 1 while pressing the rubber member M to the sidewall unit 2 through the long holes 24b drilled on the support device 12. In such an embodiment, in a state where the rubber member M is supported by the support device 12, the rubber member M is sequentially crimped in the radial direction with respect to the sidewall unit 2. Consequently, the rubber member M is not transferred from the support device 12 to the sidewall unit 2 before crimping the rubber member M to the sidewall unit 2. Therefore, it is possible to uniformly adhere the rubber member to the sidewall unit without wrinkling.

In addition, in the present embodiment, the press members 32 move from the inner side, toward the outer side in the radial direction of the tire intermediate body 1, while crimping the rubber member M to the sidewall unit 2 of the tire intermediate body 1. Accordingly, the press members 32 can press the rubber member M from an acute angle direction with respect to the sidewall unit 2, and the press members 32 can be smoothly moved while the rubber member M is pressed.

In addition, in the present embodiment, a plurality of the press members 32 radially arranged around the rotation shaft L of the tire intermediate body 1 are in contact with the annular rubber member M in the circumferential direction at each predetermined interval. Therefore, it is possible to uniformly press the rubber member M to the sidewall unit 2 in the circumferential direction.

In addition, in the present embodiment, while maintaining a state where the press members 32 press the rubber member M to the sidewall unit 2 of the tire intermediate body 1, the support device 12 is moved apart from the sidewall unit 2 of the tire intermediate body 1. Accordingly, the rubber member M is not curled up, even if being pulled by the support device 12, when the rubber member M is peeled off from the support device 12, and the rubber member M can be uniformly adhered to the sidewall unit 2.

What is claimed is:

1. A manufacturing method of a pneumatic tire,
    wherein an annular rubber member is molded, across a through hole, on a support surface of a support device that includes the support surface and the through hole which opens to the support surface,
    wherein the rubber member molded on the support surface is arranged so as to oppose a sidewall unit of a shaped tire intermediate body,
    wherein the support device is moved close to the tire intermediate body and the rubber member on the support surface is brought into contact with the sidewall unit,
    wherein a press member presses the rubber member to the sidewall unit via the through hole, and
    wherein the rubber member is adhered to the sidewall unit by moving the press member that presses the rubber member to the sidewall unit via the through hole, in a tire radial direction, and
    then moving the support device apart from the tire intermediate body to peel off the rubber member from the support surface of the support device, wherein the rubber member on the support surface is brought into contact with the sidewall unit by bending the support device.

2. The manufacturing method of a pneumatic tire according to claim 1,
    wherein the press member is moved from an inner side toward an outer side in the tire radial direction.

3. The manufacturing method of a pneumatic tire according to claim 1, wherein a plurality of press members are used to press the rubber member to the sidewall unit.

4. The manufacturing method of a pneumatic tire according to claim 1,
    wherein in a state where the press member presses the rubber member to the sidewall unit, the support device is isolated from the tire intermediate body.

* * * * *